US012759876B2

(12) United States Patent
Dijkstra et al.

(10) Patent No.: US 12,759,876 B2
(45) Date of Patent: Oct. 13, 2026

(54) SYSTEM AND METHOD FOR PRODUCING SULFUR DIOXIDE AND ASSOCIATED SULFURIC ACID PLANT

(71) Applicant: CHEMETICS INC., Vancouver (CA)

(72) Inventors: Rene Dijkstra, Vancouver (CA); Dominika Kidon, Burnaby (CA)

(73) Assignee: CHEMETICS INC., Vancouver (CA)

( * ) Notice: Subject to any disclaimer, the term of this patent is extended or adjusted under 35 U.S.C. 154(b) by 730 days.

(21) Appl. No.: 18/044,677

(22) PCT Filed: Aug. 13, 2021

(86) PCT No.: PCT/US2021/045989
§ 371 (c)(1),
(2) Date: Mar. 9, 2023

(87) PCT Pub. No.: WO2022/055662
PCT Pub. Date: Mar. 17, 2022

(65) Prior Publication Data

US 2023/0416089 A1 Dec. 28, 2023

Related U.S. Application Data

(60) Provisional application No. 63/076,165, filed on Sep. 9, 2020.

(51) Int. Cl.

| | |
|---|---|
| ***C01B 17/54*** | (2006.01) |
| ***C01B 17/76*** | (2006.01) |
| ***C01B 17/80*** | (2006.01) |

(52) U.S. Cl.
CPC .............. *C01B 17/54* (2013.01); *C01B 17/76* (2013.01); *C01B 17/806* (2013.01)

(58) Field of Classification Search
CPC ......... C01B 17/00; C01B 17/48; C01B 17/50; C01B 17/54; C01B 17/69; C01B 17/74; C01B 17/76; C01B 17/80; C01B 17/806
See application file for complete search history.

(56) References Cited

U.S. PATENT DOCUMENTS 3,803,298 A 4/1974 Reher et al.
4,046,867 A 9/1977 Seeling et al.
(Continued)

FOREIGN PATENT DOCUMENTS

CA 2802885 A1 4/2013
CA 3021202 A1 12/2018
(Continued)

OTHER PUBLICATIONS

Dijkstra, "The 'MEGA' Sulphuric Acid Plant", Sulphur + Sulphuric Acid 2018, International Conference & Exhibition, Gothenburg, Nov. 5-8, 2018. (8 pages).

(Continued)

*Primary Examiner* — Natasha E Young
(74) *Attorney, Agent, or Firm* — Seed Intellectual Property Law Group LLP

(57) ABSTRACT

Improved systems and methods are disclosed for producing sulfur dioxide using oxygen and submerged combustion. By incorporating a vapour phase combusting step in addition to the submerged combusting step, the downstream sulfur condenser may be made substantially smaller with reduced complexity and cost. Further, energy recovery is simplified and improved.

7 Claims, 4 Drawing Sheets

(56) References Cited

U.S. PATENT DOCUMENTS

| | | | | |
|---|---|---|---|---|
| 5,204,082 | A * | 4/1993 | Schendel ................ | C01B 17/54 423/539 |
| 2010/0092374 | A1 | 4/2010 | Erkes et al. | |

FOREIGN PATENT DOCUMENTS

| | | | |
|---|---|---|---|
| EP | 2330075 | A1 | 6/2011 |
| EP | 2507164 | B1 | 10/2012 |
| WO | WO 2008052649 | A1 | 5/2008 |

OTHER PUBLICATIONS

Schendel et al., "SO2-generation process can double refinery Claus unit capacity," *Oil & Gas Journal* 91(39):63-66, Sep. 27, 1993. (6 pages).

West et al., "Thermodynamic Properties of Sulfur," *Industrial and Engineering Chemistry* 42(4):713-718, Apr. 1950. (6 pages).

* cited by examiner

SYSTEM AND METHOD FOR PRODUCING SULFUR DIOXIDE AND ASSOCIATED SULFURIC ACID PLANT

This application is a U.S. National Stage Entry of International Patent Application Serial Number PCT/US2021/045989, now WO 2022/055662, filed Aug. 13, 2021, which claims priority to U.S. Provisional Application No. 63/076,165, filed Sep. 9, 2020, the entire contents of all of which are incorporated herein by reference.

TECHNICAL FIELD

The present invention pertains to improved systems and methods for producing $SO_2$ and to use thereof in plants for producing $H_2SO_4$.

BACKGROUND

Sulfur dioxide is a commonly produced industrial chemical for use as a reactant in various other chemical processes. It is produced in both pure $SO_2$ gas and/or liquefied $SO_2$ form for sale and as a gas mixture for use in downstream processes. A major industrial application for sulfur dioxide is in the production of sulfuric acid which is one of the most produced commodity chemicals in the world and is widely used in the chemical industry and commercial products.

Nowadays, the contact process is the primary process used to produce sulfuric acid commercially (developed in 1831 by P. Phillips). Typically, this involves obtaining a supply of sulfur dioxide by combusting a supply of sulfur with ambient air and then oxidizing the sulfur dioxide with oxygen in the presence of a catalyst (typically vanadium oxide) to accelerate the reaction in order to produce sulfur trioxide. The reaction of sulfur dioxide to sulfur trioxide is reversible and exothermic and it is important to appropriately control the temperature of the gases over the catalyst in order to achieve the desired conversion without damaging the contact apparatus which comprises the catalyst.

The produced sulfur trioxide is then converted to sulfuric acid by absorption into a concentrated sulfuric acid solution with subsequent water addition to the now more concentrated acid to maintain the acid concentration. This indirect reaction of the sulfur trioxide with water avoids the consequences of directly dissolving sulfur trioxide into water which is a highly exothermic reaction. The absorbing of the sulfur trioxide is usually done in one or more absorption towers.

Distributors are used in the absorption towers to distribute strong sulfuric acid solution across the top of a packed bed within the tower. Sulfur trioxide gas flows through the tower in generally counter-current flow to the solution, but it can also flow co-currently. The strong sulfuric acid solution is used to absorb the flowing sulfur trioxide. In CA2802885, an improved energy efficient system was disclosed for producing sulfuric acid that employs an intermediate absorption subsystem comprising a spray tower, an energy recovery subsystem, and an intermediate absorption tower comprising a packed bed. This and similar systems are commercially available under the trade-mark ALPHA™.

In WO2008/052649, a process was disclosed for the continuous catalytic complete or partial oxidation of a starting gas containing from 0.1 to 66% by volume of sulfur dioxide plus oxygen, in which the catalyst is kept active by means of pseudoisothermal process conditions with introduction or removal of energy. The related apparatus is for the continuous catalytic complete or partial oxidation of a starting gas containing sulfur dioxide and oxygen, and is characterized by at least one tube contact apparatus which is an upright heat exchanger composed of at least one double-walled tube whose catalyst-filled inner tube forms a reaction tube, with heat being transferred cocurrently around the reaction tube and an absorber for separating off $SO_3$ being installed downstream of the tube contact apparatus. The reactivity of the catalyst is preset by mixing with inert material. This process and apparatus are commercially available under the trade-mark CORE™ Large volumes of sulfuric acid are required to produce phosphate based fertilizer. Large companies exist in the industry that are located in areas with an abundance of phosphate rock and which employ large integrated fertilizer complexes for the production thereof. Outputs between 4000 and 5000 mtpd now come from such sulfuric acid plants and as the plants continue to become larger, it is getting uneconomic to fabricate the converters, absorbing towers and gas-gas exchangers involved. The result is that multiple sulfuric acid plants are required to meet the increasing demand.

To address this problem, sulfuric acid plants and processes have recently been disclosed that practically allow for capacities in excess of 10,000 mtpd. For example, this technology is disclosed in Canadian patent application CA3021202 titled Sulfuric Acid Plant and published Dec. 24, 2018 and also The "MEGA" Sulphuric Acid Plant, by R. Dijkstra, Chemetics Inc., Vancouver, BC, Canada, Presented at Sulphur 2018 International Conference & Exhibition (Gothenburg 5-8 Nov. 2018). Here, sulfur is combusted to sulfur dioxide using oxygen instead of air and using submerged combustion to manage the heat which is generated. The design offers lower capital expenditure as well as enhanced energy recovery.

Notwithstanding that the use of oxygen instead of air has long been considered to combust sulfur to sulfur dioxide (e.g. EP2330075 & EP2507164) historically, commercial sulfur burning, sulfuric acid plants have always used ambient air as the source of the oxygen required in the process. The use of ambient air is inexpensive and the conventional process operating at approximately 11-12 vol % $SO_2$ into the converter perfectly balances the $O_2$:$SO_2$ ratio required for high conversion and the maximum allowable temperature in the first catalyst bed. The disadvantage of using air is that each required molecule of oxygen also comes with approximately four molecules of inert gas (mainly $N_2$ and argon) which must also flow through the plant, therefore requiring very large equipment to handle to entire gas flow.

In the sulfuric acid plants disclosed in the aforementioned CA3021202, submerged combustion is primarily used to produce sulfur dioxide. However, due to the relatively low latent heat of sulfur, a large amount of sulfur is evaporated from the combustion bath along with the sulfur dioxide vapour produced (approx. 23 kg sulfur vapour for every kg of sulfur reacted to sulfur dioxide). Thus, large gas volumes have to be handled and the substantial amount of sulfur vapour present practically must be recovered, along with associated heat energy, using a sulfur condensing step in a sulfur condenser. In this sulfur condensing step, sulfur is recovered as liquid sulfur and the remaining gas mixture consists mainly of sulfur dioxide and a now modest amount of residual sulfur vapour. This modest amount of residual sulfur vapour then undergoes a secondary combustion to essentially convert it all to sulfur dioxide too. (Secondary combustion techniques for the combustion of sulfur to sulfur dioxide have long been known to those skilled in the art; e.g. as disclosed in U.S. Pat. No. 3,803,298.)

The sulfur condenser in such plants needs to operate at either high or low temperature to avoid operating at the viscosity peak for sulfur at 170° C. (e.g. as discussed in U.S. Pat. No. 5,204,082). Operation of the sulfur condenser at temperatures below the viscosity peak temperature only allows recovery of low grade energy in the form of low pressure steam and/or hot water which is undesirable given the large quantity of energy available. Operating the sulfur condenser at temperatures above the viscosity peak temperature allows useful energy to be recovered (e.g. 40 barg steam), but in this case not all sulfur vapor is condensed and even at the expected operating temperature of 275-300° C., the condensed liquid sulfur has undesirably high viscosity. This makes the sulfur more difficult to condense and because the condensed sulfur liquid flows slowly, oversized piping is required. Thus, the sulfur condensing step is relatively complex and the associated sulfur condenser is a relatively large and expensive piece of equipment. It is therefore highly desirable to reduce the amount of sulfur that must be condensed and recovered.

The chemistry of sulfur is quite complex and numerous allotropes can exist in molecules which differ in both the arrangement of atoms and the number of atoms. Under common or standard conditions, sulfur is a solid material and forms molecules with 8 sulfur atoms, i.e. $S_8$. However, allotropes $S_n$ are known to exist in the liquid and vapor phase in which n can range from 1 to 8 and even higher. The allotrope diagram for sulfur is complex and the thermodynamic properties of each allotrope differs. Additionally, the conversion between the various allotropes either requires or releases energy. For simplicity, in developing and engineering chemical processes and equipment involving sulfur, the presence of various sulfur allotropes—other than the primary allotrope involved—and the various differences in their associated properties are frequently not taken into account in their entirety.

There remains a desire for continual improvement in plant design and operation for the production of sulfur dioxide, and particularly for the efficient and cost-effective production of ever larger volumes of sulfuric acid therefrom. The present invention addresses this desire and provides other benefits as disclosed below.

SUMMARY

In the production of sulfur dioxide using submerged combustion and pure oxygen or oxygen enriched air as a reactant, it has been discovered that a very substantial reduction in the amount of sulfur vapour needing to be condensed can be achieved, along with a significant improvement in energy recovery, by incorporating an additional vapour phase combusting step and taking advantage of the types, amounts, and properties of the various sulfur allotropes involved.

Specifically, an inventive system for the production of sulfur dioxide gas comprises a submerged combustion reactor, a vapour phase combustion chamber, and apparatus for cooling a gas and for condensing sulfur vapor into liquid sulfur. The submerged combustion reactor is for the combustion of molten sulfur to sulfur dioxide and comprises an inlet for a supply of molten sulfur, an inlet for a supply of oxygen at ≥90% purity by volume, an inlet for condenser sulfur, and an outlet. The vapour phase combustion chamber is for the combustion of sulfur vapour to sulfur dioxide and comprises an inlet connected to the outlet of the submerged combustion reactor, an inlet for a supply of oxygen at ≥90% purity by volume, and an outlet. The apparatus for cooling a gas and for condensing sulfur vapor into liquid sulfur comprises an inlet connected to the outlet of the vapour phase combustion chamber, an outlet for liquid sulfur connected to the condensed sulfur inlet of the submerged combustion reactor, and an outlet for a gas mixture comprising sulfur dioxide and residual sulfur vapour.

In general, the apparatus for cooling a gas and for condensing sulfur vapor into liquid sulfur may involve a single piece of equipment that can accomplish both functions (e.g. in smaller systems). More typically however, the two functions would be accomplished in separate processing components, namely a heat exchanger for cooling a gas and a sulfur condenser for condensing sulfur vapour into liquid sulfur. In such a case, the heat exchanger comprises the inlet connected to the outlet of the vapour phase combustion chamber, and an outlet. The sulfur condenser comprises an inlet connected to the outlet of the heat exchanger, the outlet for liquid sulfur connected to the condensed sulfur inlet of the submerged combustion reactor, and the outlet for a gas mixture comprising sulfur dioxide and residual sulfur vapour.

The aforementioned system advantageously may successfully employ a smaller sulfur condenser than that in the prior art. For instance, the sulfur condenser can be sized to condense less than 10 times the mass of molten sulfur supplied to the submerged combustion reactor. As a further advantage, due to the higher temperatures in the heat exchanger more energy is recovered at high temperature thus making the recovered energy more valuable.

The sulfur dioxide production system may be used to produce sulfur dioxide gas or liquefied sulfur dioxide for a variety of purposes in which case a further sulfur condenser operating at low temperature is required to remove the residual sulfur vapor from the sulfur dioxide gas. It is however particularly suitable for use in a sulfuric acid plant, and more particularly a single contact, single absorption sulfuric acid plant. Generally, such a sulfuric acid plant comprises the aforementioned sulfur dioxide production system, a secondary combustion chamber, a contact apparatus, and an absorption system. The secondary combustion chamber is for the combustion of residual sulfur vapour to sulfur dioxide and comprises an inlet connected to the outlet of the sulfur condenser for the gas mixture, an inlet for an oxygen containing gas (preferably oxygen at >90% purity but any oxygen containing gas including air could be used), and an outlet for process gas consisting essentially of sulfur dioxide and oxygen. The contact apparatus is for converting sulfur dioxide to sulfur trioxide and comprises an inlet connected to the process gas outlet of the secondary combustion chamber and an outlet for sulfur trioxide. The absorption system is for converting sulfur trioxide to sulfuric acid and comprises an inlet connected to the sulfur trioxide outlet of the contact apparatus, and an outlet for sulfuric acid.

A suitable contact apparatus for the sulfuric acid plant is a tubular reactor cooled by molten salt. Optionally, the submerged combustion reactor, the vapour phase combustion chamber, and the secondary combustion chamber may share a common supply of oxygen at ≥90% purity by volume.

The secondary combustion chamber in the instant sulfuric acid plant can desirably comprise an inlet for recycle gas from the absorption system wherein the recycle gas comprises sulfur dioxide, oxygen and accumulated inert gases. The secondary combustion chamber can thus simultaneously reheat the recycle gas without the need for additional heat exchangers.

In the associated method of the invention, sulfur dioxide is produced by combusting molten sulfur with oxygen at >90% purity by volume using submerged combustion to produce a first gas mixture comprising sulfur dioxide and sulfur vapour comprising molecules of sulfur $S_n$ wherein n≥2, then vapour phase combusting the sulfur vapour in the first gas mixture with oxygen or oxygen enriched air to produce a second gas mixture comprising sulfur dioxide and sulfur vapour in which the concentrations of sulfur dioxide and sulfur vapour in the second gas mixture are greater and less respectively than the concentrations in the first gas mixture, then cooling the second gas mixture to produce a third gas mixture comprising sulfur dioxide and sulfur vapour, and then condensing sulfur vapour into liquid sulfur from the third gas mixture to produce a fourth gas mixture comprising sulfur dioxide and residual sulfur vapour. The method is characterized in that the average number $n_{average}$ of the sulfur atoms in the sulfur molecules in the second gas mixture is at least 20% lower than the $n_{average}$ of the sulfur atoms in the sulfur molecules in the first gas mixture.

In a desirable exemplary method of the invention, the average number $n_{average}$ of the sulfur atoms in the sulfur molecules in the second gas mixture is more than 50% lower than the $n_{average}$ of the sulfur atoms in the sulfur molecules in the first gas mixture.

In the method, the cooling step can be performed at a temperature above the dewpoint of sulfur and the cooling can remove more than 50% of the energy released during the combustion of sulfur in the submerged combustion and vapour phase combusting steps.

In a representative embodiment, 30 to 50% of the total oxygen combusted in the submerged and vapour phase combusting steps is combusted in the submerged combusting step and 50 to 70% of the total oxygen is combusted in the vapour phase combusting step.

In other representative embodiments, the average number of sulfur atoms of the $S_n$ molecules for all n≥2 in the first gas mixture can be in the range from 6.4 to 7.0. Further, the average number of sulfur atoms of the $S_n$ molecules for all n≥2 in the second gas mixture can be in the range from 2.1 to 3. Further still, the average number of sulfur atoms of the $S_n$ molecules for all n≥2 in the third gas mixture can be in the range from 6.4 to 7.0.

In yet other representative embodiments, the temperature of the first gas mixture can be in the range from 440 to 500° C. Further, the temperature of the second gas mixture can be in the range from 650 to 700° C. Further still, the temperature of the third gas mixture can be in the range from 400 to 475° C.

As mentioned above, the invention may be used to produce sulfur dioxide gas or liquefied sulfur dioxide for numerous purposes, but is particularly suitable for use in producing sulfuric acid in a sulfuric acid plant. In such an embodiment sulfur dioxide is produced according to the aforementioned method, after which conventional steps for producing sulfuric acid therefrom may be employed.

DETAILED DESCRIPTION

Unless the context requires otherwise, throughout this specification and claims, the words "comprise", "comprising" and the like are to be construed in an open, inclusive sense. The words "a", "an", and the like are to be considered as meaning at least one and are not limited to just one.

The words "oxygen" or "pure oxygen" are to be considered as meaning oxygen in concentrations equal to or exceeding 90% by volume.

Herein, the average number $n_{average}$ of the sulfur atoms in the sulfur molecules in a given gas mixture is defined as the sum of all sulfur atoms contained in the sulfur molecules in the gas mixture divided by the total moles of sulfur in the gas mixture.

The trade-marks CORE-S™ and CORE-SO2™ refer to the molten salt cooled tubular reactor and the processes of the invention respectively.

The present invention represents a significant improvement to the sulfur dioxide generation portion of the system and methods disclosed in CA3021202. While this disclosure was directed specifically to use in sulfuric acid production plants, the sulfur dioxide generation portion may instead be employed to generate pure $SO_2$ gas or liquefied $SO_2$ (by condensing the $SO_2$ in the gas mixture in a $SO_2$ liquefaction system) directly for sale or for use in other applications. (Note: a difference between use for sulfuric acid production is that not all sulfur content of the gas has to be removed in this application, for instance being allowed to contain up to 10-20 mol % sulfur (expressed as $S_1$), whereas for use as pure $SO_2$ or liquefied $SO_2$, cooling to a lower temperature to condense all sulfur, e.g. to <1 mole % sulfur (expressed as $S_1$) from the gas would typically be required.)

In the submerged combustion step of molten sulfur with oxygen, it has been discovered that the significant presence of the variety of sulfur allotropes in the gas mixture produced can be advantageously used to reduce the ultimate amount of sulfur that needs to be condensed in the process and also to simplify and improve energy recovery in the process. This is a consequence of the amounts and thermodynamic properties of the different sulfur allotropes present.

Figure 1A:
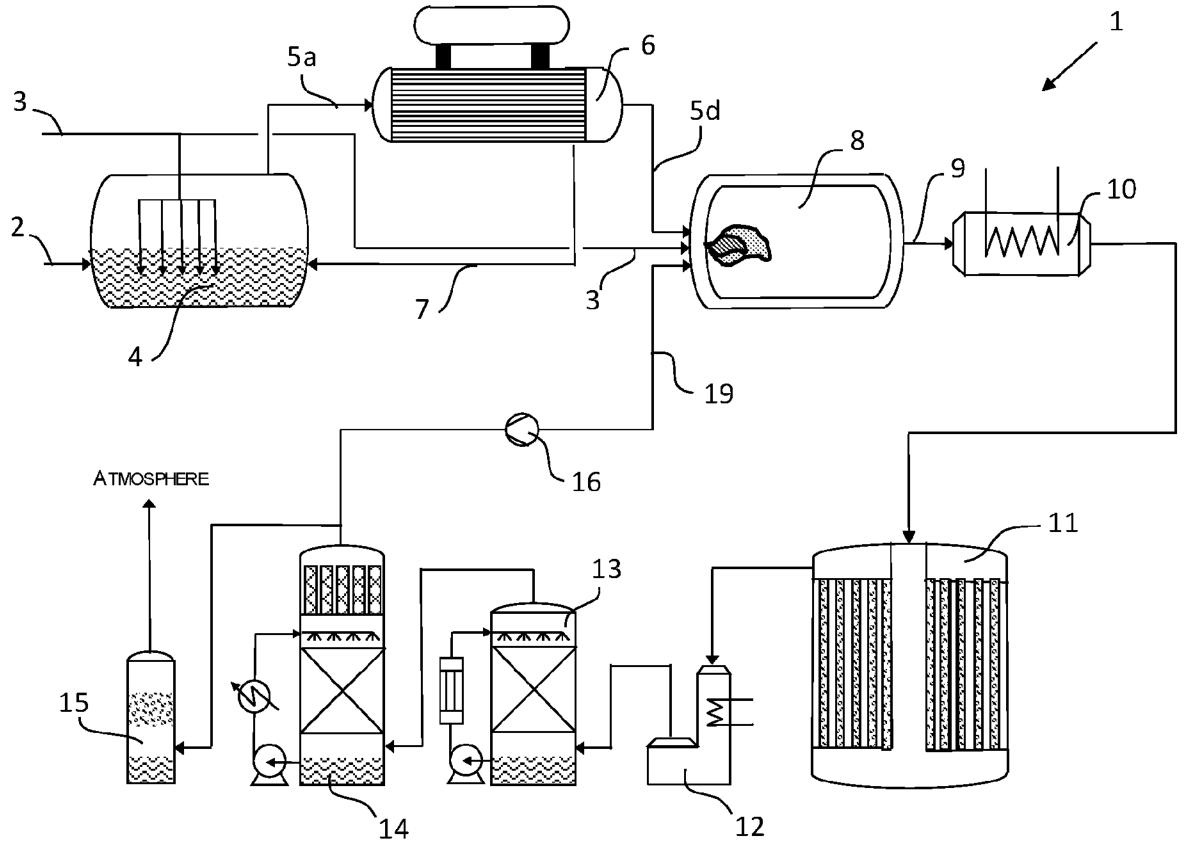
FIG. 1a Prior art
FIG. 1*a* is a schematic of an improved SCSA (single contact, single absorption) sulfuric acid plant recently disclosed in the art (e.g. CA3021202) in which sulfur is combusted to sulfur dioxide using oxygen and submerged combustion.

In the primary combustion stage of the process involving submerged combustion, all the oxygen supplied is consumed and excess sulfur remains in the gas mixture produced. In the prior art process where the entire primary combustion is accomplished by submerged combustion, a gas mixture comprising sulfur dioxide and sulfur gases is created with a very large relative amount of sulfur vapour (approximately 7-9 kg sulfur vapour for every kg of sulfur dioxide formed). It was realized that if an initial portion of the supplied oxygen were used to generate this mixture, the additional remaining portion of oxygen could be used to convert part of the sulfur in the vapour to $SO_2$ (while still consuming all the supplied oxygen), while at the same time the reaction energy from the vapour phase combustion of sulfur to $SO_2$ would be taken up by the gas mixture. This energy would be used to convert $S_8$ allotrope molecules to four $S_2$ molecules and in a like manner convert other n≥2 sulfur allotropes to $S_2$ (e.g. $S_6$ molecules to three $S_2$ molecules). This conversion of the sulfur molecules results in a much lower gas temperature rise than would otherwise be expected due to the endothermic nature of the conversion of larger sulfur molecules into multiple smaller sulfur molecules and thus most of the total oxygen used in the primary combustion stage can actually be used in the vapour phase combusting step rather than in the submerged combusting step. Having a large portion of the associated energy in the hot gas mixture then readily allows this energy to be recovered at a high temperature (via a conventional heat exchanger) without having to condense sulfur which is not only more complicated but also only allows energy to be recovered at lower temperature. Consequently, a significantly smaller amount of sulfur needs to be condensed and smaller amount of energy has to be recovered from the condensing sulfur allowing the sulfur condenser to be sized significantly smaller than in the prior art. In the preferred embodiment of the invention less than 3 kg of sulfur is condensed for every kg sulfur dioxide produced FIG. 1*a* shows a schematic of a prior art SCSA (single contact, single absorption) sulfuric acid plant recently disclosed in CA3021202. Here, overall improvements were obtained by combusting sulfur to sulfur dioxide using oxygen and submerged combustion. In part to meet the increased demand of major fertilizer producers throughout the world, such sulfuric acid plant designs allowed for single train capacities in excess of 10,000 mtpd with lower capital expenditure as well as enhanced energy recovery. The use of pure oxygen and submerged combustion provide advantages including: the gas volume involved is reduced and hence the equipment size by more than 70%; a main blower is not required since oxygen is received under pressure, thereby saving power; a drying tower system is eliminated since the supplied oxygen contains no moisture; low temperature submerged combustion allows for all-metal construction; high conversion can be achieved in a single pass; being a single absorption design, no reheat exchangers nor secondary absorption system are required; and enhanced energy recovery is obtained thereby producing more steam.

In SCSA plant 1 of FIG. 1*a*, molten sulfur 2 and pure oxygen 3 (>90% purity by volume) are supplied to submerged combustion reactor 4 and undergo a primary (submerged) combustion therein. Gas mixture 5*a* comprising sulfur dioxide and sulfur vapour is produced and is directed to sulfur condenser 6. Sulfur vapour in gas mixture 5*a* is condensed and removed therefrom as mixture 7 (comprising condensed liquid sulfur and a modest amount of sulfur dioxide). The resulting gas mixture 5*d* comprising sulfur dioxide and residual sulfur vapour is directed to secondary combustion chamber 8. An additional amount of pure oxygen 3 is also supplied to secondary combustion chamber 8 and undergoes a secondary combustion with the residual sulfur in gas mixture 5*d*. Essentially all residual sulfur vapour is reacted (combusted) to produce process gas 9 suitable for the contact process.

Figure 1B:
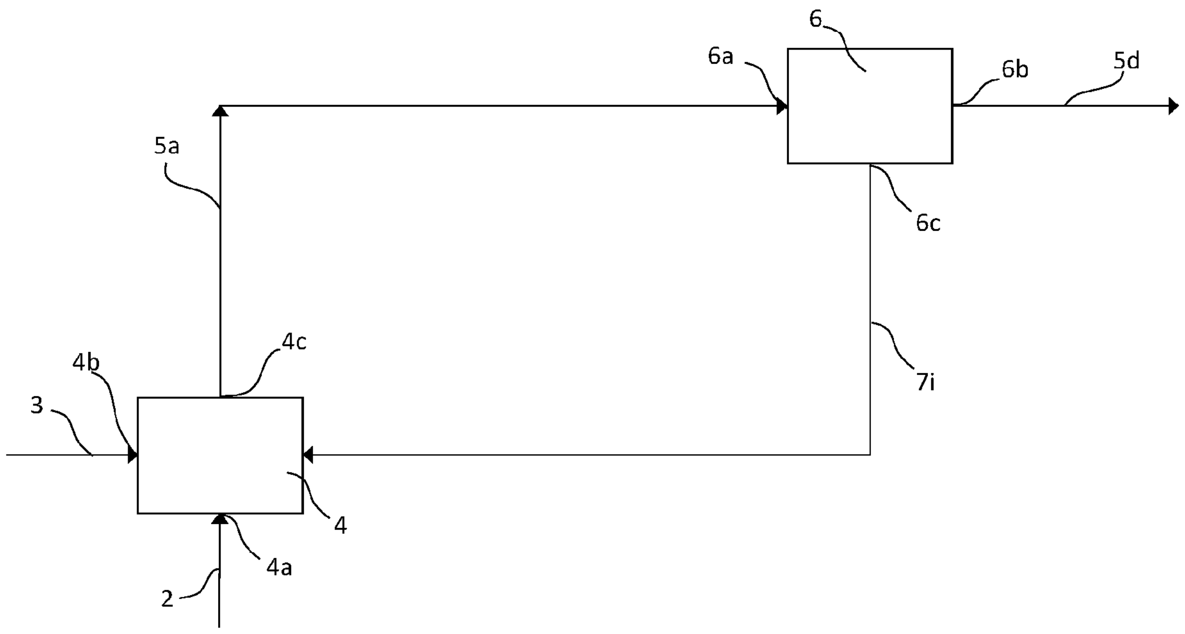
FIG. 1b Prior art
FIG. 1*b* is a schematic showing the primary combustion part of the $SO_2$ production system in the SCSA of FIG. 1*a*.
Figure 1C:
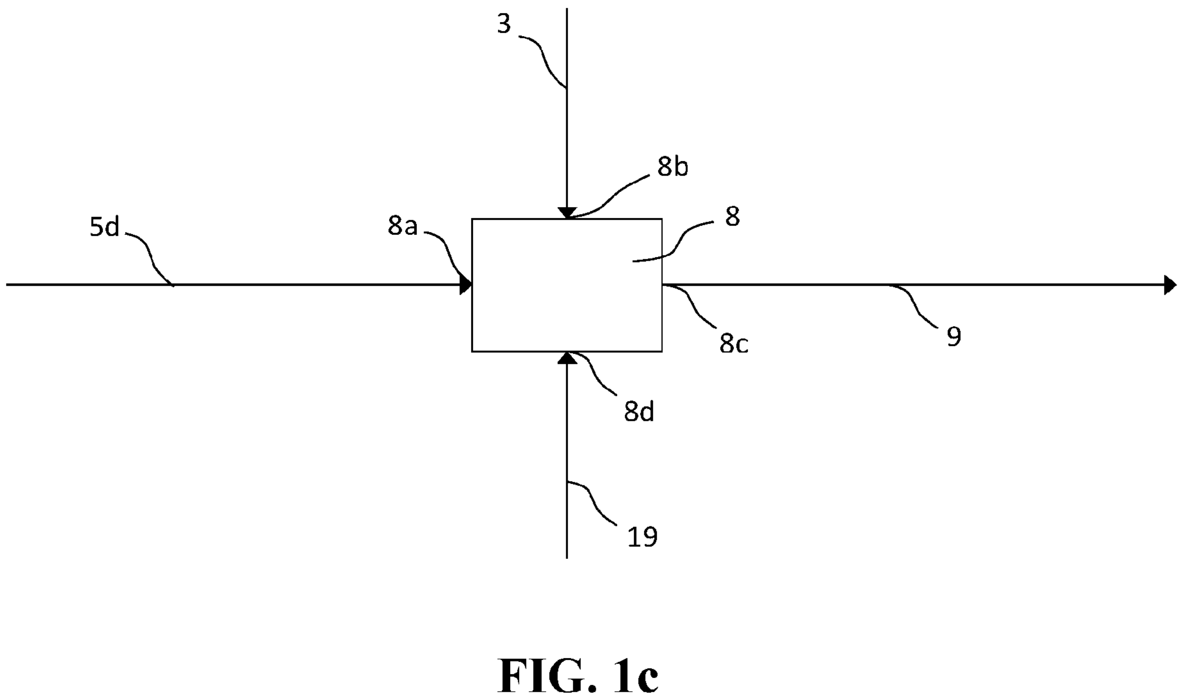
FIG. 1c Prior art
FIG. 1*c* is a schematic showing the secondary part of the $SO_2$ production system in the SCSA of FIG. 1*a*.

The remaining components shown in FIG. 1*a* and their relative configuration in SCSA plant 1 are well known in the art and only discussed briefly here. As shown, process gas 9 is directed to superheater 10 where it is cooled prior to conversion to sulfur trioxide in contact apparatus 11 (e.g. a CORE-S™ tubular reactor cooled by molten salt). The produced sulfur trioxide is directed to economizer 12, then to optional hot absorption system 13, and then to cold absorption system 14 in which sulfur trioxide is absorbed in sulfuric acid to produce more concentrated sulfuric acid product. SCSA plant 1 also comprises purge gas cleaning unit 15 (in which a small amount of gas, essentially containing all the inert gases that enter the system with the oxygen are removed to prevent their accumulation) and $SO_2$ blower 16 (which recycles unreacted $SO_2$ and $O_2$ gas obtained from cold absorption system 14 for further conversion to sulfur trioxide). As mentioned, the schematic of SCSA plant 1 of FIG. 1*a* has been simplified to focus on the main components and systems involved. However, those skilled in the art are aware that numerous other components and interconnections can, and typically are, included in practical plants. For instance, a heat exchanger (e.g. a boiler, economizer, or gas-gas exchanger) may be employed upstream of contact apparatus 11 to cool the gases to its required inlet temperature. Further, contact apparatus 11 also typically has an outlet (not shown) for any unconverted sulfur dioxide gas and oxygen. Further still, absorption systems 13, 14 also typically have an outlet (not shown) for unabsorbed gases (e.g. sulfur dioxide, oxygen, inert gases) The schematics in FIGS. 1*b* and 1*c* are directly solely to the $SO_2$ production system in SCSA plant 1 and show the primary and secondary combustion parts respectively. In FIG. 1*b*, molten sulfur 2 and pure oxygen 3 (>90% purity by volume) are shown supplied to submerged combustion reactor 4 at inlets 4*a* and 4*b* respectively and undergo a primary (submerged) combustion therein. Gas mixture 5*a* comprising sulfur dioxide and sulfur vapour is produced and is directed from outlet 4*c* to inlet 6*a* of sulfur condenser 6. Sulfur vapour in gas mixture 5*a* is condensed and removed therefrom in mixture 7*i* (which comprises condensed liquid sulfur and a modest amount of dissolved sulfur dioxide) at outlet 6*c*. The resulting gas mixture 5*d* comprising sulfur dioxide and residual sulfur vapour is obtained from outlet 6*b* and directed to a secondary combustion stage.

In FIG. 1*c*, gas mixture 5*d* from sulfur condenser 6 is directed to inlet 8*a* of secondary combustion chamber 8. Although any oxygen containing gas may be used in the secondary combustion, conveniently pure oxygen 3 is also supplied to secondary combustion chamber 8 at inlet 8*b*. The residual sulfur vapour in gas mixture 5*d* undergoes secondary combustion with the supplied oxygen, essentially to completion, to produce $SO_2$ process gas 9 which is obtained from outlet 8*c*. Recycle gas 19 from cold absorption system 14 is also seen here being supplied to secondary combustion chamber 8 at inlet 8*d*.

While SCSA plant 1 provides many advantages, undesirably a substantial amount of sulfur vapour needs to be condensed in sulfur condenser 6.

Figure 2:
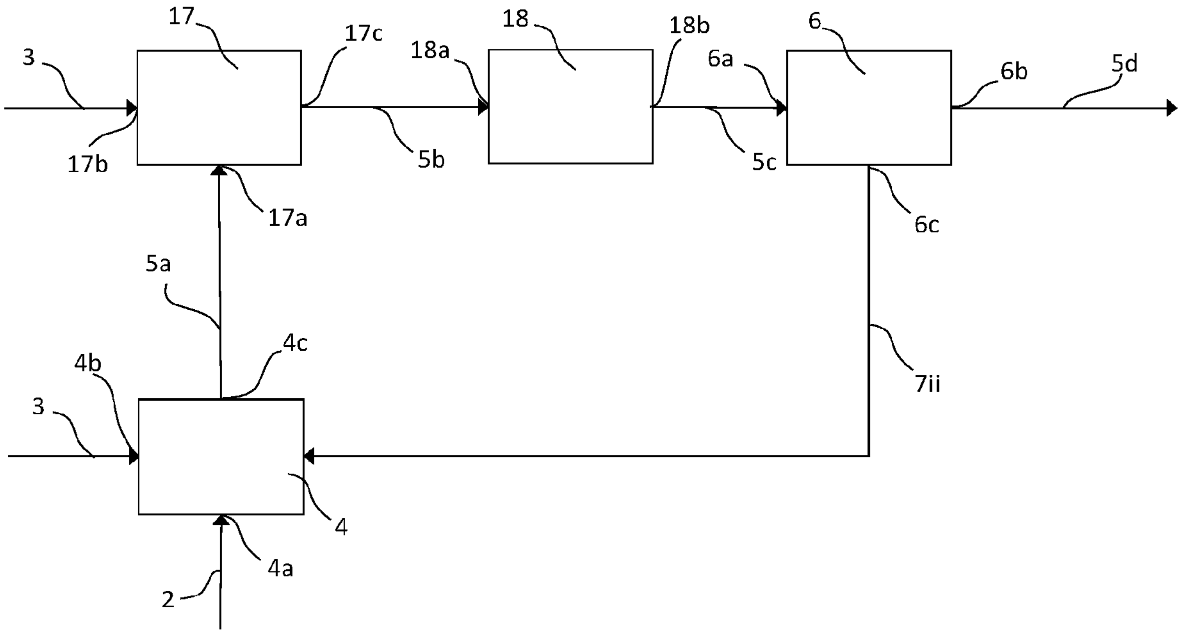
FIG. 2 is a schematic showing the primary combustion part of the $SO_2$ production system in a system of the invention.

A SCSA plant of the invention is next illustrated in the schematic of FIG. 2. With the exception of the primary combustion part of the plant, everything else about the inventive SCSA plant can be the same as that shown in FIG. 1*a*. Thus, FIG. 2 only shows the primary combustion part of the inventive SCSA plant and the differences between it and the prior art are readily apparent (e.g. by comparing FIG. 2 to FIG. 1*b*).

As is evident from FIG. 2, the primary combustion part differs from FIG. 1*b* in that vapour phase combustion chamber 17 and heat exchanger 18 have been incorporated. Molten sulfur 2 and pure oxygen 3 are again supplied to submerged combustion reactor 4 at inlets 4*a* and 4*b* respectively and undergo a primary (submerged) combustion therein. First gas mixture 5*a* comprising sulfur dioxide and sulfur vapour is again produced but this time is directed from outlet 4*c* to inlet 17*a* of vapour phase combustion chamber 17. Pure oxygen 3 is also supplied to vapour phase combustion chamber 17 at inlet 17*b* and further primary vapour phase combustion takes place therein. Second gas mixture 5_b_ is obtained from outlet 17_c_ and comprises significantly more $SO_2$ and greater amounts of S allotropes in which n is less than about 5. Second gas mixture 5_b_ is directed to heat exchanger 18 at inlet 18_a_ whereupon it is cooled and output as cooler third gas mixture 5_c_ from outlet 18_b_. (In FIG. 2, heat exchanger 18 is depicted as a single component, but cooling may for instance be accomplished in one or more stages using one or more units.) Third gas mixture 5_c_ is next directed to inlet 6_a_ of sulfur condenser 6 where sulfur vapour is condensed and removed therefrom in mixture 7_ii_ at outlet 6_c_. The resulting fourth gas mixture 5_d_ here is obtained from outlet 6_b_ and directed to the secondary combustion stage.

Comparing FIG. 2 to 1_b_, the amounts of sulfur and total oxygen supplied in the overall primary combustion steps can be the same. Further, the gas mixtures 5_d_ being forwarded along to secondary combustion in each case can be the same. However, much less sulfur vapor needs to be condensed and returned from sulfur condenser 6 in the inventive embodiment of FIG. 2 than in the prior art embodiment in FIG. 1_b_. Further, a substantial amount of heat energy for use elsewhere in the plant can readily be obtained from heat exchanger 18. This is illustrated in detail in the following Examples.

In embodiments of the invention, any known or conventional vapour phase combustion chamber types may be considered for use as vapour phase combustion chamber 6. Further, any known or conventional gas-gas (e.g. steam superheater) or gas-liquid (e.g. steam boiler or molten salt cooler) heat exchangers may be considered for use as heat exchanger 18. In other embodiments however, the function of the heat exchanger 18 and sulfur condenser 6 can be carried out in a single, integrated piece of equipment. Further still, the various supplies of pure oxygen can be obtained from a common supply (e.g. a vacuum swing absorption unit, typically 90-93% purity, or a cryogenic air separation unit, typically >98% purity, are likely sources) or alternatively more than one supply may be considered.

A characteristic of the present invention is that the apparatus and operation results in the average number $n_{average}$ of the sulfur atoms in the sulfur molecules in the second gas mixture 5_b_ being at least 20% lower than the $n_{average}$ of the sulfur atoms in the sulfur molecules in the first gas mixture 5_a_. More particularly, the average number $n_{average}$ of the sulfur atoms in the sulfur molecules in the second gas mixture 5_b_ may be more than 50% lower than the $n_{average}$ of the sulfur atoms in the sulfur molecules in the first gas mixture 5_a_. Further, sulfur condenser 6 can be sized smaller than that used in the prior art, e.g. sized to condense less than 10 times the mass of molten sulfur supplied to the submerged combustion reactor.

In the operation of the $SO_2$ production system of the invention, the cooling performed in heat exchanger 18 may preferably be carried out at a temperature above the dew-point of sulfur and such cooling can remove more than 50% of the energy released during the combustion of sulfur in the submerged combustion and vapour phase combusting steps.

In the representative embodiments shown in the Figures and in the following Examples, it is seen that 30 to 50% of the total oxygen combusted in the submerged and vapour phase combusting steps can be combusted in the submerged combusting step and 50 to 70% of the total oxygen can be combusted in the vapour phase combusting step. Further, the average number of sulfur atoms of the $S_n$ molecules for all n≥2 in the first, second, and third gas mixtures can be in the ranges from 6.4 to 7.0, 2.1 to 3, and 6.4 to 7.0 respectively.

Further still, the temperature of the first gas mixture can be in the range from 440 to 500° C., the temperature of the second gas mixture can be in the range from 650 to 700° C., and the temperature of the third gas mixture can be in the range from 400 to 450° C.

However, those of ordinary skill will appreciate that the amounts, temperatures, and desired operating conditions (such as operating pressure) may need to be modified somewhat in accordance with differing situations and plant apparatus. It is expected however that those of ordinary skill will be able to make such modifications using the disclosed teachings and the following Examples for guidance.

In general terms, a main advantage of using submerged combustion using enriched air or pure oxygen at >90% concentration is that the temperature of the combustion products are limited to the boiling point of sulfur (e.g. ~450° C. at 0.5 barg & ~575° C. at 4 barg). However, due to the relatively low latent heat of sulfur, a large amount of sulfur is evaporated from the bath resulting in large gas volumes that have to be handled. Thus, large amounts of sulfur need to be condensed from the $SO_2$ gas before it is sent for further use. The sulfur condenser in the system needs to operate at either high or low temperature to avoid the sulfur viscosity peak at 170° C., but even at the expected operating temperature of 275-300° C., the condensed liquid sulfur has high viscosity. This makes the sulfur more difficult to condense and the condensed sulfur liquid flows slowly requiring oversized pipes.

Additionally, for larger plant capacities the large amounts of oxygen gas that must be distributed into the molten salt bath require large equipment to ensure good gas/liquid contact. Existing submerged sulfur combustion systems have been limited to approx 50 tpd sulfur capacity. To meet the larger demand for sulfuric acid, capacities of up to 3000 tpd sulfur are foreseen. The present invention addresses this in part by accomplishing some of the combusting in the vapour phase instead of via submerged combustion. Advantage is taken of the fact that at low temperatures, most of the sulfur vapour exists in the form of $S_6$, $S_7$ and $S_8$ molecules whereas at high temperatures, the superheated sulfur vapour exists primarily as $S_2$ molecules. The conversion of $S_6$, $S_7$ and $S_8$ molecules into $S_2$ molecules requires significant amounts of energy resulting in a gas that heats up significantly slower than is expected based on the normal heat capacity of the mixture. The reaction of $S_6$, $S_7$ and $S_8$ to $S_2$ is reversible and when the gas is cooled down, the reaction energy is released again.

The present invention splits the sulfur combustion into two portions, namely submerged and vapour phase combustion. The released reaction energy in the latter is used to heat the sulfur vapour and produce $S_2$ molecules. Due to the reaction of $S_6$, $S_7$ and $S_8$ to $S_2$ molecules, the vapour has a very high apparent heat capacity and the vapour only increases relatively modestly in temperature to (e.g. to ~700° C. instead of the ~2000° C. that would be expected based on conventional heat capacity alone). The process temperature (and hence oxygen addition) is preferably limited to about 700° C. to ensure some of the sulfur molecules remain in the $S_6$, $S_7$ and $S_8$ form which prevents temperature spikes in case of process fluctuations. The reaction of sulfur to sulfur dioxide in the gas phase has the additional benefit that significantly less sulfur remains in the gas before it is cooled resulting in smaller equipment for condensing the remaining sulfur.

The reversible reaction of $S_6$, $S_7$ and $S_8$ to $S_2$ takes place essentially entirely in the vapour phase and the heat exchanger required to remove the majority of the reaction energy (up to 75% of the total sulfur combustion energy) can operate above the sulfur dewpoint and therefore does not need to be designed to handle liquid sulfur. This simplifies the design and allows higher grade energy to be recovered. The remaining sulfur combustion energy is recovered in a sulfur condenser.

It should be clear that although the aforementioned description has focused on sulfur dioxide production for use in sulfuric acid plants with large capacity, the same process and economic benefits exist for smaller plants and for other applications using sulfur dioxide.

The following Examples have been included to illustrate certain aspects of the invention but should not be construed as limiting in any way.

EXAMPLES

Computer modeling was used to calculate the expected compositions and temperatures of the various gas mixtures involved in using submerged combustion and oxygen to produce sulfur dioxide for a commercial scale SCSA sulfuric acid plant (similar to that shown in FIG. 1*a*). In particular, the relative amounts of sulfur allotropes for n=2 to 8 were considered in this modeling.

Three cases were modeled, the first (Comparative example) being based on the plant and method disclosed in the aforementioned CA3021202 and as depicted in FIGS. 1*a*-1*c*, and the other two cases (Inventive examples 1 and 2) being based on the plant and method of the invention and as depicted in FIG. 2. For easy comparison, in each case it was assumed that 100 kg/hr of pure molten sulfur was used as a feedstock and combusted and that pure oxygen was be used in primary combustion (i.e. prior to secondary combustion). The modeling software used was ProMax (available from Bryan Research & Engineering LLC) and the modeling results were verified against literature data (such as provided in the article by James R. West, "Thermodynamic Properties of Sulfur").

Values for the prior art SCSA plant or Comparative example during exemplary operation were obtained and are tabulated in Table 1. Specifically, the temperatures, pressures, mass flows, and compositions of the various streams depicted in FIG. 1*b* (namely sulfur 2, oxygen 3, gas mixtures 5*a* and 5*d*, and mixture 7*i*) were obtained and tabulated. Further, the average number $S_n$ of the sulfur allotropes in the various gas mixtures were also determined and tabulated in Table 1. Still further, the heat load or useful energy extracted from sulfur condenser 6 was tabulated.

TABLE 1

| Comparative example | | | | | | |
|---|---|---|---|---|---|---|
| Stream (as per FIG. 1b) | | 2 | 3 | 5a | 7i | 5d |
| Temperature | ° C. | 140 | 25 | 486 | 295 | 295 |
| Pressure | bar(g) | 2 | 2 | 1.5 | 1.4 | 1.4 |
| Mass flow | Kg/hr | 100 | 82.5 | 1588.8 | 1406.3 | 182.5 |
| Heat load from sulfur condenser | | | | 205 KW | | |
| Composition | | | | | | |
| $S_2$ | mol % | 0.0 | 0.0 | 3.7 | 0.4 | 0.0 |
| $S_3$ | mol % | 0.0 | 0.0 | 0.5 | 0.0 | 0.0 |
| $S_4$ | mol % | 0.0 | 0.0 | 0.4 | 0.0 | 0.0 |
| $S_5$ | mol % | 0.0 | 0.0 | 3.1 | 1.4 | 0.0 |
| $S_6$ | mol % | 0.0 | 0.0 | 21.0 | 23.2 | 0.6 |
| $S_7$ | mol % | 0.0 | 0.0 | 21.1 | 18.4 | 0.5 |
| $S_8$ | mol % | 100.0 | 0.0 | 22.7 | 56.4 | 1.6 |
| $SO_2$ | mol % | 0.0 | 0.0 | 27.4 | 0.2 | 97.0 |
| $O_2$ | mol % | 0.0 | 100.0 | 0.0 | 0.0 | 0.0 |
| $S_n$_average | | 8.0 | | 6.6 | 7.3 | 7.3 |

With reference to FIG. 1*b* and Table 1 then, pure sulfur 2 and pure oxygen 3 are supplied to submerged combustion reactor 4 in amounts of 100 and 82.5 kg/hr and at temperatures of 25 and 140° C. respectively. 1589 kg/hr of first gas mixture 5*a* is produced whose composition includes sulfur dioxide and sulfur vapour comprising molecules of sulfur $S_n$ in which n ranges from 2 to 8 and at a temperature of 486° C. This first gas mixture 5*a* is directed to sulfur condenser 6 from which are output two mixtures, both at 295° C., namely: 1406 kg/hr of mixture 7*i* containing condensed liquid sulfur in various allotropic forms and a modest amount of $SO_2$; and 182.5 kg·hr of gas mixture 5*d* primarily containing $SO_2$ (i.e. 97% by mole) and residual sulfur vapour. The former condensed sulfur mixture is returned to submerged combustion reactor 4. The latter, primarily $SO_2$, gas mixture is directed to a secondary combustion chamber as depicted in FIG. 1*c*.

In the secondary combustion, the 182.5 kg/hr gas mixture primarily containing $SO_2$ from FIG. 1*b* and 66 kg/hr of pure oxygen are directed to secondary combustion chamber 8 where the residual sulfur vapour in the former is fully combusted to produce 360 kg/hr process gas consisting essentially of sulfur dioxide and oxygen at about 600° C.

For comparison, the two Inventive examples were based on a similar SCSA to that shown in FIGS. 1*a*-1*c* except that a vapour phase combustion chamber and a heat exchanger had been incorporated and operated in accordance with the invention. Inventive example 1 involved operation with sulfur condensing at a relatively high temperature, while Inventive Example 2 involved operation with sulfur condensing at a relatively low temperature. Again, values for these Inventive examples during exemplary operation were obtained and are tabulated in Tables 2 and 3 below. Here, the temperatures, pressures, mass flows, and compositions of the various streams depicted in FIG. 2 (namely sulfur 2, oxygen 3, gas mixtures 5*a*, 5*b*, 5*c* and 5*d*, and mixture 7*ii*) were obtained and tabulated. As before, the average number $S_n$ of the sulfur allotropes in the various gas mixtures were tabulated. And, the heat loads extracted from each of sulfur condenser 6 and heat exchanger 18 were also tabulated.

TABLE 2

| Inventive example 1 | | | | | | | | | |
|---|---|---|---|---|---|---|---|---|---|
| Stream (as per FIG. 2) | | 2 | 3 (to 4) | 5a | 3 (to 17) | 5b | 5c | 7ii | 5d |
| Temperature | ° C. | 140 | 25 | 486 | 25 | 700 | 450 | 295 | 295 |
| Pressure | bar(g) | 2.00 | 2.00 | 1.50 | 2.00 | 1.49 | 1.47 | 1.40 | 1.40 |
| Mass flow | Kg/hr | 100 | 29.3 | 575.5 | 53.2 | 628.7 | 628.7 | 446.2 | 182.5 |
| Heat load from sulfur condenser | | | | | | 60 kW | | | |
| Heat load from heat exchanger | | | | | | 145 kW | | | |

TABLE 2-continued

| | | | | | | | | | |
|---|---|---|---|---|---|---|---|---|---|
| Composition | | | | | | | | | |
| $S_2$ | mol % | 0.0 | 0.0 | 3.7 | 0.0 | 51.3 | 1.6 | 0.4 | 0.0 |
| $S_3$ | mol % | 0.0 | 0.0 | 0.5 | 0.0 | 4.0 | 0.2 | 0.0 | 0.0 |
| $S_4$ | mol % | 0.0 | 0.0 | 0.4 | 0.0 | 1.3 | 0.2 | 0.0 | 0.0 |
| $S_5$ | mol % | 0.0 | 0.0 | 3.1 | 0.0 | 2.3 | 1.7 | 1.4 | 0.0 |
| $S_6$ | mol % | 0.0 | 0.0 | 21.0 | 0.0 | 4.4 | 13.0 | 23.2 | 0.6 |
| $S_7$ | mol % | 0.0 | 0.0 | 21.1 | 0.0 | 2.8 | 12.7 | 18.4 | 0.5 |
| $S_8$ | mol % | 100.0 | 0.0 | 22.7 | 0.0 | 0.9 | 15.9 | 56.4 | 1.6 |
| $SO_2$ | mol % | 0.0 | 0.0 | 27.4 | 0.0 | 32.9 | 54.7 | 0.2 | 97.0 |
| $O_2$ | mol % | 0.0 | 100.0 | 0.0 | 100.0 | 0.0 | 0.0 | 0.0 | 0.0 |
| $S_n$_average | | 8.0 | | 6.6 | | 2.8 | 6.8 | 7.3 | 7.3 |

With reference to FIG. 2 and Table 2 then, pure sulfur 2 and pure oxygen 3 are supplied to the submerged combustion reactor 4 in amounts of 100 and 29.3 kg/hr and at temperatures of 25 and 140° C. respectively. Except that less oxygen is supplied at this stage, this is the same as that of the preceding Comparative example. This time, only 576 kg/hr of first gas mixture 5*a* is produced but with the same relative composition and at the same temperature as that of Comparative example 1. In accordance with the invention, this first gas mixture 5*a* is directed next to vapour phase combustion chamber 17 and combusted with a further 53.2 kg/hr of pure oxygen at 25° C. (i.e. the same oxygen total of 82.5 kg/hr as in the Comparative example). 629 kg/hr of second gas mixture Sb at 25° C. is output from vapour phase combustion chamber 17 at 700° C. and cooled in heat exchanger 18 to produce third gas mixture Sc at 450° C. Heat energy is recovered in heat exchanger 18 and the composition of second gas mixture Sb is seen to change significantly as it cools to become third gas mixture 5*c* (the % of $SO_2$ and of S allotropes with n>5 increases, while the % of S allotropes with n=5 or less decreases). 629 kg/hr of this third gas mixture Sc is then directed to the sulfur condenser 6 and from which two mixtures are once again output, namely mixture 7*ii* and gas mixture 5*d*, again both at 295° C. In a like manner to the Comparative example, the same amount and composition of gas mixture 5*d* is produced. The other mixture produced 7*ii* (containing condensed liquid sulfur in various allotropic forms and a modest amount of $SO_2$) and to be returned to submerged combustion reactor 4 has the same relative composition as that of mixture 7*i* in the Comparative example but much less of it is produced (i.e. 446 kg/hr instead of 1406 kg/hr). The fourth gas mixture 5*d*, which is essentially identical to that in the Comparative example, is directed to a secondary combustion chamber as depicted in FIG. 1*c*.

Inventive example 2 shows the same inventive process but differs from Inventive example 1 in that the sulfur condenser is operated at a temperature below the sulfur viscosity peak. It also illustrates that the inventive process can be operated at different pressures. Values for Inventive example 2 are tabulated in Table 3 below.

TABLE 3

| Stream (as per FIG. 2) | | 2 | 3 (to 4) | 5a | 3 (to 17) | 5b | 5c | 7ii | 5d |
|---|---|---|---|---|---|---|---|---|---|
| | | Inventive example 2 | | | | | | | |
| Temperature | ° C. | 140 | 25 | 442 | 25 | 700 | 410 | 155 | 155 |
| Pressure | bar(g) | 2.00 | 2.00 | 0.50 | 2.00 | 0.49 | 0.47 | 0.45 | 0.45 |
| Mass flow | Kg/hr | 100 | 34.3 | 576 | 65.5 | 641.5 | 641.5 | 441.7 | 199.7 |
| Heat load from sulfur condenser | | | | | | 80 kW | | | |
| Heat load from heat exchanger | | | | | | 177 kW | | | |
| Composition | | | | | | | | | |
| $S_2$ | mol % | 0.0 | 0.0 | 2.2 | 0.0 | 55.9 | 0.9 | 0.0 | 0.0 |
| $S_3$ | mol % | 0.0 | 0.0 | 0.3 | 0.0 | 3.5 | 0.1 | 0.0 | 0.0 |
| $S_4$ | mol % | 0.0 | 0.0 | 0.2 | 0.0 | 0.9 | 0.1 | 0.0 | 0.0 |
| $S_5$ | mol % | 0.0 | 0.0 | 2.4 | 0.0 | 1.3 | 1.2 | 0.3 | 0.0 |
| $S_6$ | mol % | 0.0 | 0.0 | 19.5 | 0.0 | 2.0 | 11.0 | 14.7 | 0.0 |
| $S_7$ | mol % | 0.0 | 0.0 | 19.0 | 0.0 | 1.0 | 10.2 | 7.2 | 0.0 |
| $S_8$ | mol % | 100.0 | 0.0 | 24.7 | 0.0 | 0.3 | 15.4 | 77.6 | 0.0 |
| $SO_2$ | mol % | 0.0 | 0.0 | 31.6 | 0.0 | 34.9 | 60.9 | 0.2 | 99.8 |
| $O_2$ | mol % | 0.0 | 100.0 | 0.0 | 100.0 | 0.0 | 0.0 | 0.0 | 0.0 |
| $S_n$_average | | 8.0 | | 6.8 | | 2.4 | 6.9 | 7.6 | 7.6 |

It is apparent from this modeling that the sulfur condenser required in the inventive embodiments of Inventive examples 1 and 2 can be sized much smaller than that of the Comparative example. The ratio of mass supplied to the sulfur condenser in FIG. 2 compared to that of FIG. 1 is 628/1589 or 0.40. Further, the amount of sulfur condensed in the Comparative example embodiment is 99.8% of 1406 kg/hr, which is substantially more than 10 times the amount of molten sulfur supplied to the submerged combustion reaction. However, the amount of sulfur condensed in the Inventive example 1 embodiment is 99.8% of 446 kg/hr, which is substantially less than 10 times the amount of molten sulfur supplied to the submerged combustion reaction.

As mentioned, the calculated heat loads (i.e. the amount of energy that is removed from the process) from sulfur condenser 6 and from the heat exchanger 18 are shown in Tables 1 through 3. The total heat load in Inventive example 1 is the same as that in the Comparative Example, but importantly in this inventive process, more than 70% of that total heat load can be recovered in heat exchanger 18 which operates at a temperature above 400° C. and less than 30% of the heat load is recovered from sulfur condenser 6 at much lower temperature. The energy recovered from heat exchanger 18 is recovered at higher temperature and has more economical value and can be used for high pressure (e.g. 60 barg) steam production and/or steam superheating. No condensation occurs in heat exchanger 18 and thus no viscous liquid needs to be dealt with to recover this energy.

The total heat load shown in Table 3 for Inventive example 2 is higher compared to the other examples as due to the lower condensing temperature in the sulfur condenser there is less sulfur vapour leaving in stream 5*d* and therefore more of the molten sulfur in stream 1 is converted into sulfur dioxide. However, as for Inventive example 1, approximately 70% of the total heat load can be recovered in heat exchanger 18.

Figure 3:
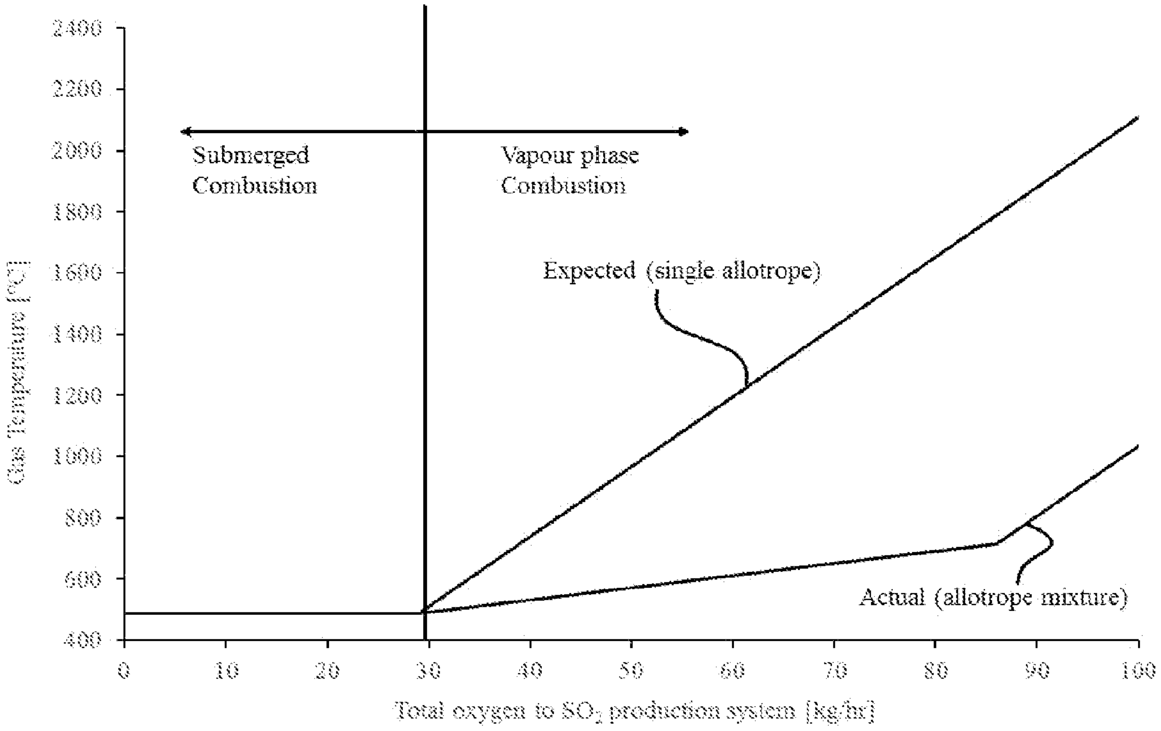
FIG. 3 compares the actual temperature of the gas mixture during the submerged and vapour phase combusting steps of Inventive example 1 to the expected temperature if only the $S_8$ allotrope were present in the mixture.

For illustrative purposes, FIG. 3 compares the actual temperature of the gas mixture during the submerged and vapour phase combusting steps in Inventive example 1 to the expected temperature during these steps if a single sulfur allotrope were assumed to be present in the mixture throughout which is normal for most gases. It is evident from FIG. 3 that the presence of the other sulfur allotropes results in an enormous difference between the actual gas temperature and the temperatures based on the single allotrope assumption during this vapour phase combusting step.

From the above Examples, it is clearly apparent that the invention allows for a substantial reduction in the size, complexity, and cost of the sulfur condensing equipment used in this process and also for a significant improvement in high temperature energy recovery.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

The invention claimed is:

1. A system for the production of sulfur dioxide gas comprising:

a submerged combustion reactor for the combustion of molten sulfur to sulfur dioxide comprising an inlet for a supply of molten sulfur, an inlet for a supply of oxygen at ≥90% purity by volume, an inlet for condenser sulfur, and an outlet;

a vapour phase combustion chamber for the combustion of sulfur vapour to sulfur dioxide comprising an inlet connected to the outlet of the submerged combustion reactor, an inlet for a supply of oxygen at ≥90% purity by volume, and an outlet;

an apparatus for cooling a gas and for condensing sulfur vapor into liquid sulfur comprising an inlet connected to the outlet of the vapour phase combustion chamber, an outlet for liquid sulfur connected to the condensed sulfur inlet of the submerged combustion reactor, and an outlet for a gas mixture comprising sulfur dioxide and residual sulfur vapour;

wherein the apparatus for cooling a gas and for condensing sulfur vapour into liquid sulfur further comprises:

a heat exchanger for cooling a gas comprising the inlet connected to the outlet of the vapour phase combustion chamber, and an outlet; and a sulfur condenser for condensing sulfur vapour into liquid sulfur comprising an inlet connected to the outlet of the heat exchanger, the outlet for liquid sulfur connected to the condensed sulfur inlet of the submerged combustion reactor, and the outlet for a gas mixture comprising sulfur dioxide and residual sulfur vapour.

2. The system of claim 1 wherein the sulfur condenser is sized to condense less than 10 times the mass of molten sulfur supplied to the submerged combustion reactor.

3. A sulfuric acid plant comprising:

the sulfur dioxide production system of claim 1;

a secondary combustion chamber for the combustion of residual sulfur vapour to sulfur dioxide comprising an inlet connected to the outlet of the sulfur condenser for the gas mixture, an inlet for an oxygen containing gas, and an outlet for process gas consisting essentially of sulfur dioxide and oxygen;

a contact apparatus for converting sulfur dioxide to sulfur trioxide comprising an inlet connected to the process gas outlet of the secondary combustion chamber and an outlet for sulfur trioxide; and an absorption system for converting sulfur trioxide to sulfuric acid comprising an inlet connected to the sulfur trioxide outlet of the contact apparatus, and an outlet for sulfuric acid.

4. The sulfuric acid plant of claim 3 wherein the contact apparatus is a tubular reactor cooled by molten salt.

5. The sulfuric acid plant of claim 3 wherein the submerged combustion reactor, the vapour phase combustion chamber, and the secondary combustion chamber share a common supply of oxygen at ≥90% purity by volume.

6. The sulfuric acid plant of claim 3 wherein the secondary combustion chamber comprises an inlet for recycle gas from the absorption system wherein the recycle gas comprises sulfur dioxide and oxygen.

7. The sulfuric acid plant of claim 3 wherein the sulfuric acid plant is a single contact, single absorption sulfuric acid plant.

* * * * *